(12) United States Patent
Pine

(10) Patent No.: US 7,064,779 B1
(45) Date of Patent: Jun. 20, 2006

(54) IMAGING SYSTEM COMBINING MULTIPLE STILL IMAGES FOR HIGHER RESOLUTION IMAGE OUTPUT

(75) Inventor: Joshua I. Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 626 days.

(21) Appl. No.: 10/072,345

(22) Filed: Oct. 23, 2001

(51) Int. Cl.
*H04N 5/225* (2006.01)

(52) U.S. Cl. .................................. 348/218.1; 348/239

(58) Field of Classification Search ............... 348/302, 348/219.1, 222.1, 252, 231, 262, 264, 274, 348/208.4, 208.13, 218.1, 329
See application file for complete search history.

(56) References Cited

U.S. PATENT DOCUMENTS

| | | | | |
|---|---|---|---|---|
| 5,585,847 A | * | 12/1996 | Sayag | ......................... 348/266 |
| 5,754,226 A | * | 5/1998 | Yamada et al. | ........... 348/219.1 |
| 6,108,036 A | * | 8/2000 | Harada et al. | ............ 348/219.1 |
| 6,552,744 B1 | * | 4/2003 | Chen | ........................ 348/218.1 |
| 6,570,613 B1 | * | 5/2003 | Howell | ..................... 348/219.1 |
| 6,727,954 B1 | * | 4/2004 | Okada et al. | ................ 348/374 |
| 2002/0126209 A1 | * | 9/2002 | Yamada et al. | ............. 348/219 |

* cited by examiner

*Primary Examiner*—Tuan Ho
*Assistant Examiner*—Gary C. Vieaux
(74) *Attorney, Agent, or Firm*—Farjami & Farjami LLP

(57) ABSTRACT

Digital image enhancement techniques and apparatus are provided that increase the effective resolution of a digital imager without requiring an increase in the number of pixel sensors in the digital imager. Multiple images are captured in succession from the digital imager. The multiple images are compared in order to determine a correlation between the pixels of each image and the pixels of each of the other images. Two or more of the multiple images are employed to produce a single image of greater resolution than the resolution of any single image alone.

17 Claims, 5 Drawing Sheets

IMAGING SYSTEM COMBINING MULTIPLE STILL IMAGES FOR HIGHER RESOLUTION IMAGE OUTPUT

BACKGROUND OF THE INVENTION

1. Technical Field

The invention relates generally to a method of and apparatus for increasing the effective resolution of a digital imager.

BACKGROUND OF THE INVENTION

2. Description of the Related Art

Over the past number of years, digital cameras have begun to replace more conventional film camera. Digital cameras employ electronic devices, or "imagers," to capture a picture by using electronic components. Originally, the technology of electronic image capture employed charged-coupled devices (CCDs) in products such as a television camera in 1975 and an observatory telescope in 1979. In 1982, the first solid state personal camera using CCDs was introduced.

A low cost and more commonly available electronic component that is suitable for imagers is a complementary metal oxide semiconductor (CMOS) sensor. One advantage of CMOS sensors is that, unlike CCD technology, other circuits such as those required for error correction, image stabilization, image compression and image enhancement may be incorporated in the same chip. In addition, a single chip design typically requires less power than a multiple chip design, thus increasing battery life.

Typically, a picture produced by all but the most expensive digital camera does not have as fine a resolution as the more traditional film-based cameras. CMOS imager sensors included in digital cameras are fabricated as a two-dimensional array of millions of pixels. Until now, the only way to increase the resolution of the pictures the digital camera produces is to increase the number of pixels. Of course, increasing the number of pixels also increases the cost and complexity of the imager.

SUMMARY

Digital image enhancement techniques and apparatus are provided that increase the resolution of a digital imager without requiring an increase in the number of pixel sensors in the digital imager. Multiple images are captured in succession from the digital imager, typically following a time interval corresponding to the length of time it takes to capture and store each image. The multiple images are compared in order to determine a correlation between the pixels of each image and the pixels of each of the other images. Two or more of the multiple images are employed to produce a single image of greater resolution than the resolution of any single image alone. The technique takes advantage of a change in position of the digital imager between the capture of individual images and the resultant differences in the captured images. These resultant differences represent additional data that is employed to create a single image with a higher resolution than a digital imager is typically capable of producing. In other words, a digital imager with two million sensors can produce an image with a resolution equivalent to a digital sensor with four million pixels or more.

The techniques of the disclosed embodiment may be implemented in circuitry that is either co-located with an imaging array or located on an additional electronic component coupled to the imaging array. An advantage to the technique is that it reduces the need for addition pixel sensors to produce a higher resolution image. The technique can be implemented either in real time, as the digital images are produced, or implemented offline on successive images that have been stored in an electronic storage medium.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Although described with particular reference to a solid state imager, the image enhancement device (IED) of the invention can be implemented in any system in which it is desirable to increase the effective resolution of an image without increasing the number of hardware components. In addition, although described in conjunction with a color imager, the disclosed techniques are equally applicable to a monochrome imager.

The IED of the invention can be implemented in software, hardware, or a combination of hardware and software. Selected portions of the IED are implemented in hardware and software. The hardware portion of the invention can be implemented using specialized hardware logic. The software portion can be stored in a memory and be executed by a suitable instruction execution system (microprocessor). The hardware implementation of the IED can include any or a combination of the following technologies, which are well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, the software of the IED, which comprises an ordered listing of executable instructions for implementing logical functions, can be embodied in any computer-readable medium for use by or in connection with an instruction execution system, apparatus or device, such as a computer-based system, processor-containing system or other system that can fetch instructions from the instruction execution system, apparatus or device and execute the instructions.

In the context of this document, a "computer-readable medium" can be any means that can contain, store, communicate, propagate or transport the program for use by or in connection with the instruction execution system, apparatus or device. The computer-readable medium can be, for example but not limited to, an electronic, magnetic optical, electromagnetic, infrared or semiconductor system, apparatus or device. More specific examples (a nonexhaustive list) of the computer readable medium would include the following: an electrical connection (electronic) having one or more wires, a portable computer diskette (magnetic), a random access memory (RAM), a read-only memory (ROM), an erasable programmable read-only memory (EPROM or Flash memory), (magnetic), an optical fiber (optical) and a portable compact disc read-only memory or another suitable medium upon which the program is printed, as the program can be electronically captured, via for instance optical scanning of the paper or other medium, then compiled, interpreted or otherwise processed in a suitable manner if necessary, and then stored in a computer system.

Figure 1:
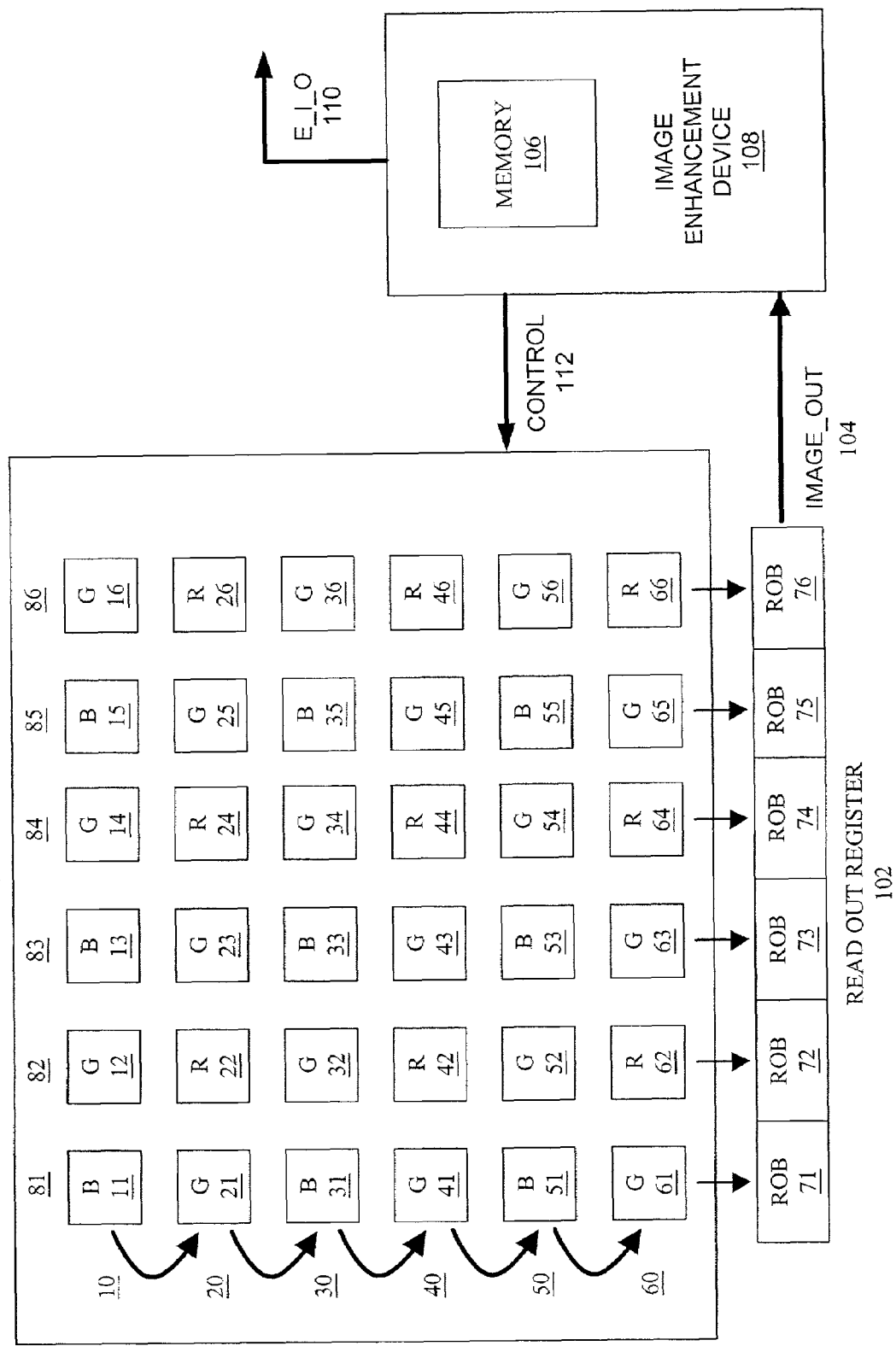
FIG. 1 illustrates an exemplary imaging array.

Turning now to the figures, FIG. 1 illustrates an imaging array 100 that includes thirty-six pixel sensors 11–16, 21–26, 31–36, 41–46, 51–56 and 61–66. Typically, an imager array contains millions of pixel sensors, but, for simplicity, the illustrated imaging array 100 contains only thirty-six pixel sensors. In the disclosed embodiment, each pixel sensor is a charged-coupled devices (CCD) that builds a charge when exposed to light of a wavelength of a particular color. In alternative embodiments, the techniques may be implemented in other types of electronic devices such as a complementary metal oxide semiconductor (CMOS) device and a silicon germanium (SiGe) device In this manner, the imaging array captures an image that is then stored in a digital format. In order to capture an image, the pixel sensors 11–16, 21–26, 31–36, 41–46, 51–56 and 61–66 of the imaging array 100 are exposed to light, the pixel values are read, processed according to the techniques of the disclosed embodiment, and recorded. An image that is captured at a particular time within the pixel sensors 11–16, 21–26, 31–36, 51–56 and 61–66 of the imaging array 101 is referred to as a "frame." Each frame captures a digital representation of the scene, or "view," at which the digital imager 100 is pointed.

In this example, the imaging array is configured in a "Bayer" pattern. A Bayer pattern consists of alternating rows with alternating colors in each row; i.e., alternate rows 10, 30 and 50 are similar, and alternate rows 20, 40 and 60 are similar. Rows 10, 30 and 50 include alternating blue ("B") and green ("G") pixel sensors. In row 10, pixels 11, 13 and 15 are blue; and pixel sensors 12, 14 and 16 are green. Rows 20, 40 and 60 include alternating green and red ("R") pixel sensors. In row 20, pixel sensors 21, 23 and 25 are green; and pixel sensors 22, 24 and 26 are red. This alternating colors in alternating rows is relevant to the techniques of the disclosed embodiment because between successive captured images the imaging array typically moves a slight amount. The techniques compare pixel sensors of the same color to determine a correspondence between successive images. Because of the alternating pixel sensor colors, the imaging array must move either almost no distance or at least a two-pixel distance for pixel sensors of the same color in corresponding images to represent the same or close to the same point in a scene captured by the pixel sensors. The techniques take advantage of the difference between images; and, if pixels of the same color in corresponding images represent the same point, little image resolution is gained. Thus, the two-pixel distance between pixel sensors of the same color provide a wider timing window for successive images.

Also included in the imaging array 100 is a read out register 102. The read out register 102 includes read out bytes (ROBs) 71–76. In order to record the values of the pixel sensors 11–16, 21–26, 31–36, 41–46, 51–56 and 61–66, the pixel values are shifted into the read out register 102 and then transmitted sequentially, producing an IMAGE_OUT signal 104. ROBs 71–76 correspond to columns 81–86 of pixel sensors, respectively. During a read of the imaging array, columns 81–86 are shifted into corresponding ROBs 71–76 one row art a time. For example, the value of the pixel sensor 61 of column 81 is shifted into the ROB 71, the value of pixel sensor 51, also of column 81, is shifted into pixel sensor 61, and so on. In other words, once the pixel sensors 61–66 of row 60 are shifted into the ROBs 71–76 of the read out register 103, the ROBs 71–76 are transmitted sequentially as the IMAGE_OUT signal 104. Then, row 50 is shifted into row 60, row 40 is shifted into row 50 and so on. This process is continued until the values of all the pixel sensors 11–16, 21–26, 31–36, 41–46, 51–56 and 61–66, or the frame, have been transmitted as the IMAGE_OUT signal 104.

The imaging array 100 transmits the IMAGE_OUT signal 104 to an image enhancement device 108. The IED 108 includes a memory 106 for storing data transmitted on the IMAGE_OUT signal 104 and for storing code to implement the techniques of the disclosed embodiment. The memory 106 may be implemented as registers, random access memory (RAM), first-in, first-out (FIFO) memory, or some other well known memory system. The specific type of memory 106 is not critical to the spirit of the invention. A CONTROL signal 112 is transmitted from the IED 108 to the imaging array 100. The function of the CONTROL signal 112 is explained in more detail below in conjunction with FIG. 5. Also transmitted from the IED 108 is an ENHANCED_IMAGE_OUT ("E_I_O") signal 110. The E_I_O signal 110 represents an enhanced image produced according to the techniques of the disclosed embodiment.

Figure 2:
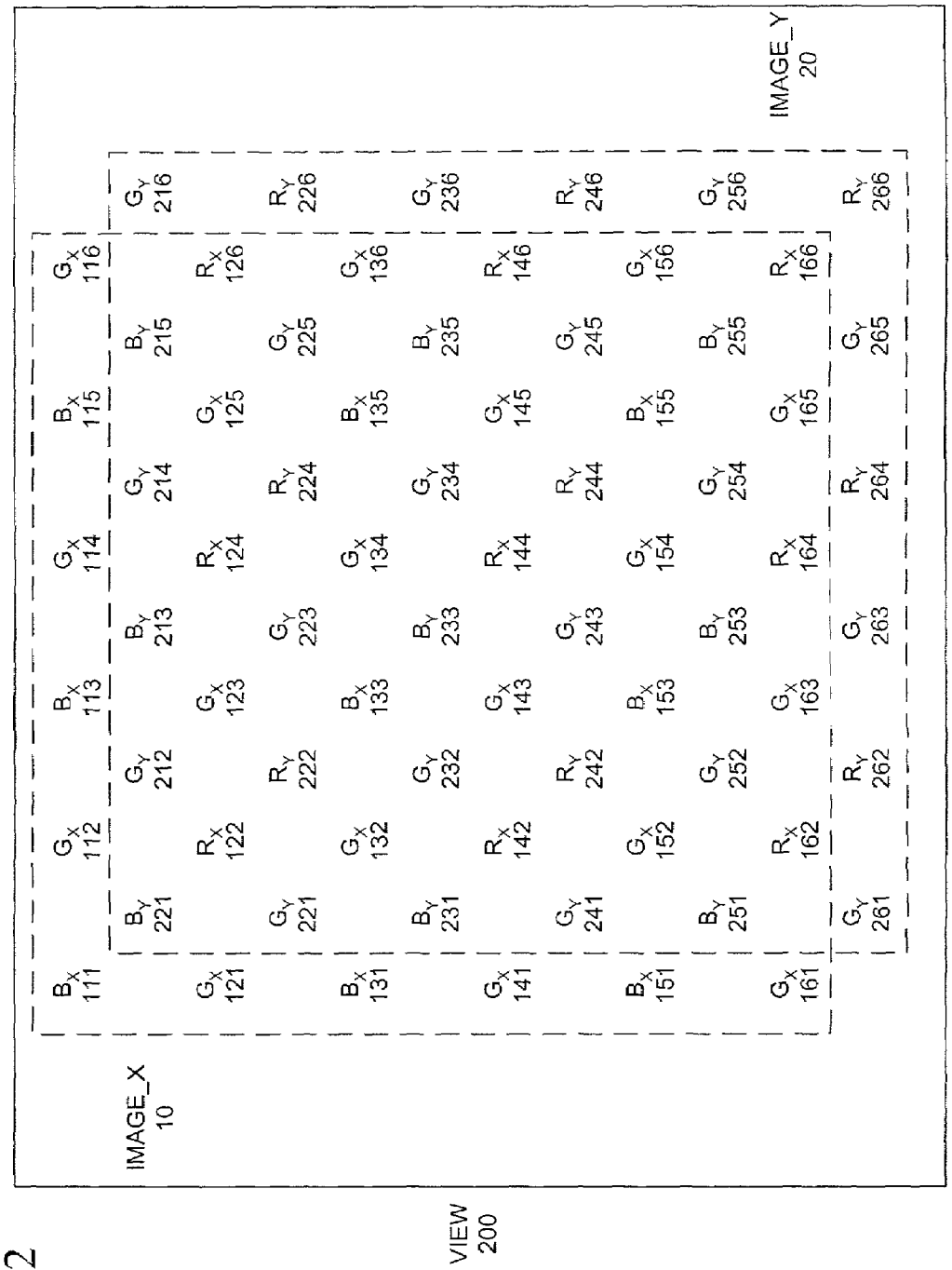
FIG. 2 illustrates two successive images from the imaging array of FIG. 1 superimposed upon one another.

FIG. 2 illustrates two successive images, an image_X 10 and an image_Y 20, both of which include pixel values read from the imaging array 100 (FIG. 1). Image_X 10 and image_Y 20 are superimposed on each other. Image_X 10 includes pixel values $B_X$ 111, $G_X$ 112, $B_X$ 113, $G_X$ 114, $B_X$ 115, $G_X$ 116, $G_X$ 121, $R_X$ 122, $G_X$ 123, $R_X$ 124, $G_X$ 125, $R_X$ 126, $B_X$ 131, $G_X$ 132, $B_X$ 133, $G_X$ 134, $B_X$ 135, $G_X$ 136, $G_X$ 141, $R_X$ 142, $G_X$ 143, $R_X$ 144, $G_X$ 145, $R_X$ 146, $B_X$ 151, $G_X$ 152, $B_X$ 153, $G_X$ 154, $B_X$ 155, $G_X$ 156, $G_X$ 161, $R_X$ 162, $G_X$ 163, $R_X$ 164, $G_X$ 165 and $R_X$ 166. Image_Y 20 includes pixel values $B_Y$ 211, $G_Y$ 212, $B_Y$ 213, $G_Y$ 214, $B_Y$ 215, $G_Y$ 216, $G_Y$ 221, $R_Y$ 222, $G_Y$ 223, $R_Y$ 224, $G_Y$ 225, $R_Y$ 226, $B_Y$ 231, $G_Y$ 232, $B_Y$ 233, $G_Y$ 234, $B_Y$ 235, $G_Y$ 236, $G_Y$ 241, $R_Y$ 242, $G_Y$ 243, $R_Y$ 244, $G_Y$ 245, $R_Y$ 246, $B_Y$ 251, $G_Y$ 252, $B_Y$ 253, $G_Y$ 254, $B_Y$ 255, $G_Y$ 256, $G_Y$ 261, $R_Y$ 262, $G_Y$ 263, $R_Y$ 264, $G_Y$ 265 and $R_Y$ 266.

The pixel values 111–116, 121–126, 131–136, 141–146, 151–156, 161–166, 211–216, 221–226, 231–236, 241–246, 251–256 and 261–266 of image_X 10 and image_Y 20 represent pixel values captured by successive readings of the pixel sensors 11–16, 21–26, 31–36, 41–46, 51–56 and 61–66 (FIG. 1). Each of the pixel sensors 11–16, 21–26, 31–36, 41–46, 51–56 and 61–66 captures a light value corresponding to a spot in a scene, or "view," 200 to which the imaging array 100 is pointed. A complete image such as one represented by the pixel values 111–116, 121–126, 131–136, 141–146, 151–156, 161–166 typically takes 30 milliseconds (ms) to be transferred from the imaging array 100, through the ROBs 71–76, transmitted out the IMAGE_OUT signal 104 (FIG. 1) and stored in the memory 106. In this 30 ms time interval, the position of the imaging array 100 may shift a small distance with the result that the image_X 10 represents a slightly different frame than the image_Y 20. The techniques of the disclosed embodiment take advantage of this small difference between image_X 10 and image_Y 20 to produce a single image with a higher resolution than either image_X 10 or image_Y 20 alone. The position of image_X 10 with respect to image_Y 20 depends upon the amount the imaging array 100 has moved in the time interval between the two images 10 and 20. The time interval between the capture of image_X 10 and image_Y 20 may be between the minimum time necessary to read out an image from the imaging array 100, or 30 ms in this example, to a dynamically-determined of fixed interval of time, such as 100 ms.

Figure 3:
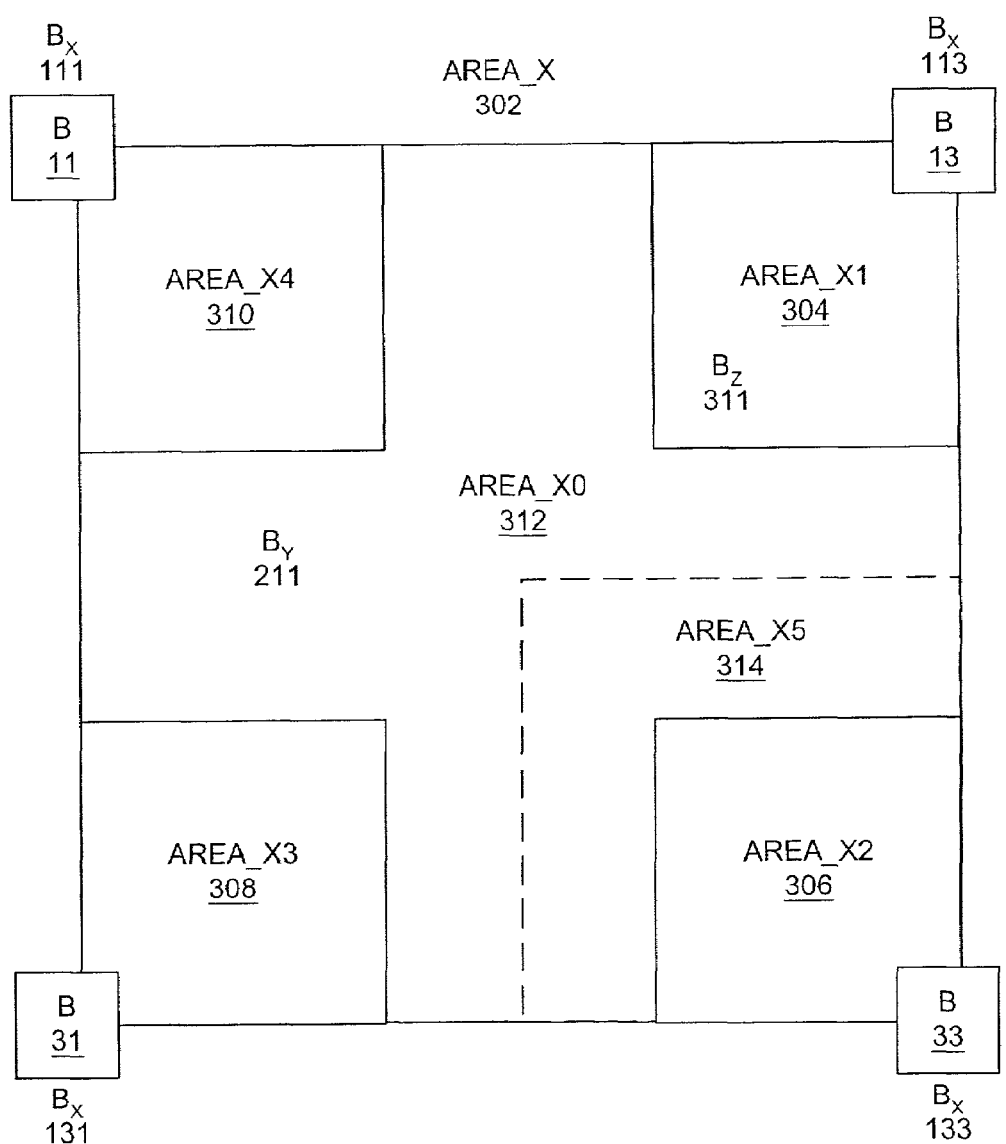
FIG. 3 illustrates possible positions for pixels of successive images with respect to each other.

FIG. 3 illustrates a four-pixel sensor portion of the imaging array 100, specifically pixel sensors B 11, B 13, B 31 and B 33. In this example, the pixel sensors B 11, B 13, B 31 and B 33 are assumed to be in position to capture the pixel values $B_X$ 111, $B_X$ 113, $B_X$ 131 and $B_X$ 133. After the imaging array 100 shifts position between the capture of image_X 10 and image_Y 20, the pixel B 11 captures pixel value $B_Y$ 211 of image_Y 20. After the imaging array 100 shifts position between the capture of image_Y 20 and an image_Z (not shown), the pixel B 11 captures a pixel value $B_Z$ 311 of image_Z. An area_X 302 is the space between the pixel sensors B 11, B 13, B 31 and B 33 and represents some possible pixel value capture locations of the pixel sensor B 11, assuming that the imaging array 100 has shifted in the direction of area_X 302 and not beyond.

Included within area_X 10 are four areas of equal size, an area_X1 304, an area_X2 306, and area_X3 308 and an area_X4 310, adjacent to pixel sensor B 13, pixel sensor B 33, pixel sensor B 21 and pixel sensor B 11 respectively. When added together, area_X1 304, area_X2 306, area_X3 308 and area_4 310 represent one half (½) of the area of area_X 302. An area_X0 312 is the area within area_X 302 that does not include area_X1 304, area_X2 306, area_X3 308 or area_X4 310. Area_X0 312 also represents one half (½) of the area of area_X 302. If the pixel value $B_Y$ 211 represents a value of light measured somewhere within the area_X 302, then pixel value $B_Y$ 211 has an approximately fifty percent (50%) probability of representing a pixel sensor reading in area_X0 312 and an approximately fifty percent (50%) probability of representing a pixel sensor reading in one of area_X1 304, area_X2 306, area_X3 308 and area_X4 310. Although the resolution of a resultant image produced according to the disclosed techniques from image_X 10 and image_Y 20 is better than either image_X 10 or image_Y 20 regardless of where within area_X 302 that pixel sensor B 111 is located, the resultant image is typically more desirable the greater the separation between the pixel sensors when image_X 10 is captured and when image_Y 20 is captured. In other words, it is desirable for pixel value $B_Y$ 211 to fall within area_X0 312 rather than area_X1 304, area_X2 306, area_X3 308 or area_X4 310. An area_X5 314 represents the portion of area_X0 closest to the pixel sensor B 33. If a pixel sensor reading falls within area_X 302 but outside of both area_X2 306 and area_X5 314, then the pixel value capture position is closer to one of the other pixel sensors B 11, B 13 or B 31.

If the third successive image, image_Z, is captured by the imaging array 100, then a third point, the pixel value $B_Z$ 311, is captured. The pixel value $B_Z$ 311, like the pixel value $B_Y$ 211, has a fifty percent (50%) probability of falling within area_X0 312. Assuming that the positions of the pixel values $B_Y$ 211 and the pixel value $B_Z$ 311 with respect to the pixel sensors B 11, B 13, B 31 and B 33 are independent of each other, then the probability that at least one of pixel value B 211 and pixel value B 311 falls within the area_X0 is approximately seventy-five percent (75%), based upon the following probability equation: probability p=1−[0.5*0.5].

It should be noted that although there is approximately a seventy-five percent (75%) probability that one of pixel values 211 and 311 represents a light reading within the optimal area for image enhancement with respect to image_X 10, or area_X0 312, there is also a fifty percent (50%) probability that image_Y 20 and image_Z are at the optimal spacing with respect to each other regardless of their positions with respect to image_X 10. Thus, the probability of any two images of the images image_X 10, image_Y 20 and image_Z are optimally spaced is approximately eighty-seven percent (87%). Of course, the probability that any two of a number of images are spaced optimally with respect to each other approaches one hundred percent (100%) as the number of images increases.

Figure 4:
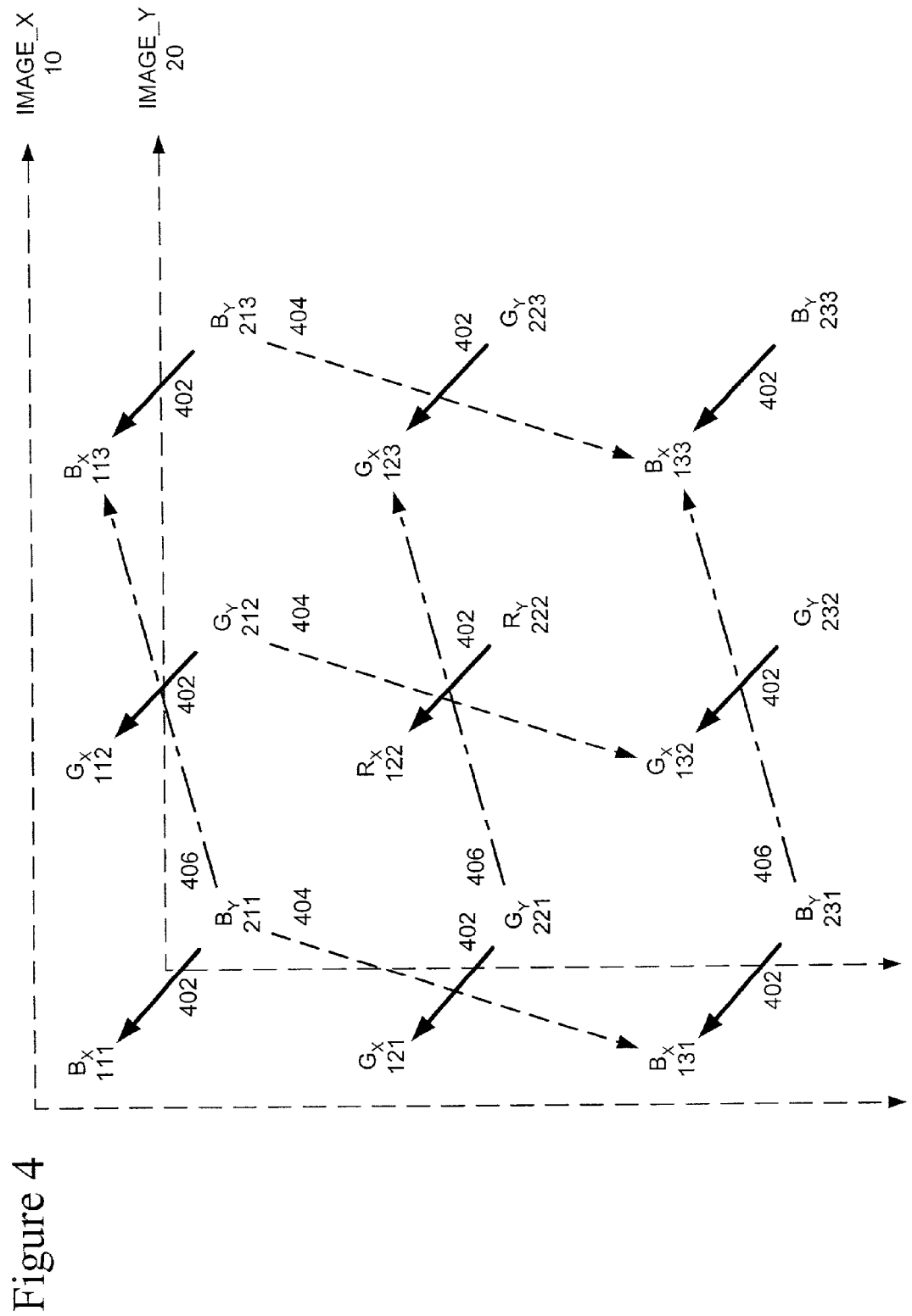
FIG. 4 illustrates several possible relationships between the corresponding pixels of the two successive images of FIG. 2.

FIG. 4 illustrates several possible correlations between the pixel values in image_X 10 and the pixel values in image_Y 20. Although it is possible for the pixels of the imaging array 100 to move farther between images than the two-pixel distance assumed for illustrative purposes in FIG. 3, the techniques of the disclosed embodiment still apply. A greater than two-pixel movement of the imaging array 100 merely complicates a correlation step 508 (see FIG. 5) without substantially changing other portions of the disclosed embodiment.

In this example, Image_Y 20 is shifted with respect to image_X 10 until a correct correlation is found. A shift 402 moves image_Y 20 so that pixel value $B_Y$ 211 is compared with pixel value $B_X$ 111, pixel value $G_Y$ 212 is compared with pixel value $G_X$ 112, pixel value $B_Y$ 213 is compared with pixel value $B_X$ 113, and so on. A shift 406 moves image_Y 20 with respect to image_X 10 so that pixel $B_Y$ 211 is compared with pixel value $B_X$ 113, pixel value $G_Y$ 221 is compared with pixel value $G_X$ 123, pixel value $B_Y$ 231 is compared with pixel value $B_X$ 133, and so on. A shift 404 moves image_Y 20 with respect to image_X 10 so that pixel $B_Y$ 211 is compared with pixel value $B_X$ 131, pixel value $G_Y$ 212 is compared with pixel value $G_X$ 132, pixel value $B_Y$ 213 is compared with pixel value $B_X$ 133, and so on.

Shifts 402, 404 and 406 are used as examples only. If the imaging array 100 moves a great enough distance between image_X 10 and image_Y 20, then the best correlation between image_X 10 and image_Y 20 may be to shift image_Y 20 several pixels distance in one direction or another. It should be noted that the term "shift" means to correspond pixels in a particular position; there is no actual shifting of pixels. After correlating the pixels values of image_X 10 and image_Y 20 in a particular position, values of corresponding pixels may be multiplied together and the values of all the products added together. The position that produces the highest sum of squares is then designated the position in which the pixels of image_X 10 and image_Y 20 correspond to each other. One with skill in the imaging arts knows various methods of correlating images and any method may be employed in the disclosed techniques.

Figure 5:
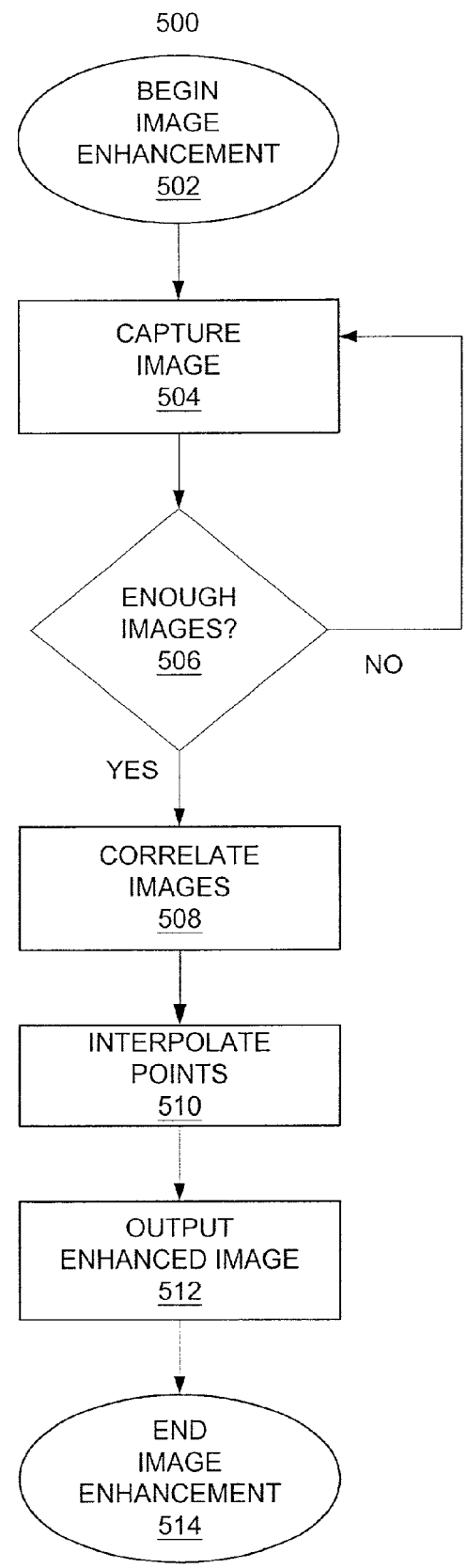
FIG. 5 is a flowchart of one embodiment of the disclosed digital image enhancement techniques.

FIG. 5 is a flowchart of a process 500 implemented by the IED 108. Process 500 begins in a Begin Image Enhancement step 502 and then proceeds directly to a Capture Image step 504. In step 504 the pixel sensors 11–16, 21–26, 31–36, 41–46, 51–56 and 61–66 of the imaging array 100 (FIG. 1)

are exposed to a light source and become charged based upon the intensity of the light source. As explained above in conjunction with FIG. 1, the values of the pixel sensors 11–16, 21–26, 31–36, 41–46, 51–56 and 61–66 are shifted into the ROBs 71–76 of the read-out register 102 and then transmitted as the IMAGE_OUT signal 104. For the purposes of this example, the first image is image_X 10 (FIG. 2). In a CMOS imaging array, this process typically takes approximately 30 ms.

Once the image is captured in step 502, process 500 proceeds to an Enough Images step 506 where the process 500 determines whether enough images have been captured in step 504. In this example, only one image, image_X 10, has been captured so process 500 proceeds to step 504 where another image, image_Y 20, is captured. Process 500 then proceeds to step 506 where again process 500 determines whether enough images have been captured. The determination of whether enough images have been captured can be based upon a fixed number of images, such as two or three, or can be based upon the properties of the images themselves. In one embodiment, the imaging array 100 automatically produces exactly two images in succession and transmits them by means of the IMAGE_OUT signal 104 for processing by the IED 108. In another embodiment, the IED 108 determines whether another image is necessary and issues a CONTROL signal 112 to the imaging array. Upon receipt of the CONTROL signal 112, the image array 100 captures another image for transmission on the IMAGE_OUT 104 signal. For example, the IED 108 can determine in real time whether any two of multiple images have the necessary degree of separation, as explained above in conjunction with FIGS. 3 and 4, to enable the IED 108 to produce a suitable image. It should be noted that once two images have been correlated, the degree of separation is inversely proportional to the similarity of the pixel values. In other words, if the pixel values of two correlated images are very similar, then there is a good probability that the like-color pixel sensors in the imaging array 100 captured successive values from close to the same spot in the view 200 (FIG. 2). A greater separation between images is desirable because more information is then captured for the disclosed enhancement techniques.

If none of the multiple images have the necessary degree of separation from at least one of the other multiple images, then process 500 signals the imaging array 100 via the control signal 112 and control returns to step 504 where another image is captured by the imaging array 100. In another embodiment, the imaging array 100 automatically captures a fixed number of images and transmits those images to the IED 108 without employing the CONTROL signal 112.

If process 500 determines in step 506 that enough images have been transmitted by the imaging array 100, then control proceeds to a correlate images step 508. As explained above, in an alternative embodiment, step 508 may be positioned between step 504 and step 506 in order to assist the determination of whether enough images have been captured in step 504. The Correlate Images step 508 functions was explained above in conjunction with FIG. 5. The image shifts 402, 404 and 406 represent three possible correlations between two images such as image_X 10 and image_Y 20. It should be noted that other shifts are possible if image_X 10 and image_Y 20 are oriented in different positions with respect to each other. For example, if the imaging array 100 has moved more that a two pixel distance between the capture of image_X 10 and the capture of image_Y 20, pixel value $B_Y$ 213 may, for example, correspond to pixel value $B_X$ 111, with all the other pixels shifted accordingly.

Following the correlation of the images in step 508, the process 500 proceeds to an Interpolate Points step 510 where the images correlated in step 508 are merged by combining the pixel values from the images into a single image. In this manner, a imaging array 100 with two million image sensors such as pixel sensors 11–16, 21–26, 31–36, 41–46, 51–56 and 61–66 can approach the resolution of an imaging array with four million or more pixels without increasing the number of pixel sensors themselves.

After step 510, the process 500 proceeds to a Output Enhanced Image step 512 where the single image produced in step 510 is transmitted on the E_I_O signal 112 (FIG. 1). Following the transmission of the single image, the process 500 proceeds to a End Image Enhancement step 514 where processing is complete.

In an alternative embodiment of the claimed subject matter, multiple images may be taken and stored before any of the processing steps are initiated. In other words, the disclosed technique may be implemented off-line. In addition, the claimed subject matter is applicable to the capture and processing of monochrome images. While various embodiments of the application have been described, it will be apparent to those of ordinary skill in the art that many more embodiments and implementations are possible that are within the scope of this invention. Accordingly, the invention is not to be restricted except in light of the attached claims and their equivalents.

I claim:

1. A method for increasing the resolution of an imaging array, the method comprising:
    capturing two or more images within the imaging array, each image captured in a successive time interval corresponding to an image capture and storage rate of the imaging array;
    correlating pixels of at least one of the two or more images by shifting to locate corresponding pixels of the other images, wherein the correlating includes multiplying values of shifted pixels and the corresponding pixels of the other images to generate a plurality of products, generating a squared sum of the plurality of products, and obtaining the highest squared sum of the plurality of products; and
    combining the correlated pixels of the two or more selected images into a single enhanced image;
    wherein an effective resolution of the single enhanced image is greater than a resolution of each of the two or more images.

2. The method of claim 1, wherein the combining comprises:
    creating new pixel values by interpolating values between the corresponding pixels of the combined images.

3. The method of claim 1, wherein the imaging array is comprised of charge-coupled device (CCD) sensors.

4. The method of claim 1, wherein the imaging array is comprised of complementary metal oxide semiconductor (CMOS) sensors.

5. The method of claim 1, wherein the successive time interval is between 10 milliseconds (ms) and 100 ms.

6. The method of claim 1, wherein the imaging array is a monochrome imaging array.

7. An image enhancing device comprising:
    means for receiving a plurality of successive images from an imaging array;
    a memory for storing the plurality of successive images; and means for correlating a first plurality of pixels of a first image of the plurality of images by shifting to locate a second plurality of pixels of a second image of the plurality of images corresponding to the first plurality of pixels, wherein the correlating means includes means for multiplying values of the first plurality of pixels and the corresponding second plurality of pixels to generate a plurality of products means for generating a squared sum of the plurality of products, and means for obtaining the highest squared sum of the plurality of products; and means for combining the first plurality of pixels with the second plurality of pixels to generate an enhanced image, such that an effective resolution of the enhanced image is greater than a resolution of either the first image or the second image.

8. The image enhancing device of claim 7, further comprising:

means for transmitting an instruction to the imaging array to capture an additional image and to transmit the additional image to the means for receiving.

9. The image enhancing device of claim 8, further comprising:

means for determining when the additional image is required from the imaging array; and means for generating the instruction when the determining means determines the additional image is required.

10. The image enhancing device of claim 7, wherein the plurality of successive images are transmitted by the imaging array between 10 milliseconds (ms) and 100 ms apart.

11. The image enhancing device of claim 7, wherein the plurality of images are captured within the imaging array by charge-coupled device (CCD) sensors.

12. The image enhancing device of claim 7, wherein the plurality of images are captured within the imaging array by complementary metal oxide semiconductor (CMOS) sensors.

13. A digital camera comprising:

an imaging array; and an image enhancement device coupled to the imaging array, the image enhancement device including:

a memory for storing two or more images received form the imaging array;

logic for correlating a first plurality of pixels of a first image of the two or more of images by shifting to locate a second plurality of pixels of a second image of the two or more of images corresponding to the first plurality of pixels, wherein the logic for correlating includes logic for multiplying values of the first plurality of pixels and the corresponding second plurality of pixels to generate a plurality of products, logic for generating a squared sum of the plurality of products, and logic for obtaining the highest squared sum of the plurality of products; and logic for combining the first plurality of pixels with the second plurality of pixels to generate an enhance image, such that an effective resolution of the enhanced image is greater than a resolution of either the first image or the second image.

14. The digital camera of claim 13, the image enhancement device further comprising:

a transmitter configured to transmit an instruction to the imaging array to capture an additional image and to transmit the additional image to the image enhancement device image.

15. The digital camera of claim 13, wherein the time between the two or more is between 10 milliseconds (ms) and 100 ms.

16. The digital camera of claim 13, wherein the two or more images are captured within the imaging array by charge-coupled device (CCD) sensors.

17. The digital camera of claim 13, wherein the two or more images are captured within the imaging array by complementary metal oxide semiconductor (CMOS) sensors.

* * * * *

UNITED STATES PATENT AND TRADEMARK OFFICE
CERTIFICATE OF CORRECTION

| | | |
|---|---|---|
| PATENT NO. | : 7,064,779 B2 | Page 1 of 1 |
| APPLICATION NO. | : 10/072345 | |
| DATED | : June 20, 2006 | |
| INVENTOR(S) | : Joshua I. Pine | |

It is certified that error appears in the above-identified patent and that said Letters Patent is hereby corrected as shown below:

In the claims, column 9, line 8, reading "products means" should read --products, means--.

In the claims, column 10, line 4, "form" should be changed to --from--.

Signed and Sealed this

Twenty-fourth Day of October, 2006

JON W. DUDAS
*Director of the United States Patent and Trademark Office*